US008627286B2

(12) United States Patent
Feigen

(10) Patent No.: US 8,627,286 B2
(45) Date of Patent: Jan. 7, 2014

(54) FULLY DECLARATIVE BUILD SYSTEM FOR BUILD OPTIMIZATION

(75) Inventor: Lawrence Feigen, Watchung, NJ (US)

(73) Assignee: Oracle International Corporation, Redwood Shores, CA (US)

( * ) Notice: Subject to any disclaimer, the term of this patent is extended or adjusted under 35 U.S.C. 154(b) by 625 days.

(21) Appl. No.: 12/748,303

(22) Filed: Mar. 26, 2010

(65) Prior Publication Data

US 2011/0239192 A1   Sep. 29, 2011

(51) Int. Cl.
*G06F 9/44* (2006.01)
*G06F 9/45* (2006.01)

(52) U.S. Cl.
USPC ............ 717/123; 717/120; 717/124; 717/140

(58) Field of Classification Search
None
See application file for complete search history.

(56) References Cited

U.S. PATENT DOCUMENTS

| | | | | |
|---|---|---|---|---|
| 7,316,010 | B1 * | 1/2008 | Daynes et al. | 717/140 |
| 7,434,202 | B2 * | 10/2008 | Kramer | 717/120 |
| 7,640,533 | B1 * | 12/2009 | Lottero et al. | 717/108 |
| 7,870,539 | B2 * | 1/2011 | Wookey | 717/124 |
| 8,042,098 | B2 * | 10/2011 | Do et al. | 717/123 |
| 8,151,252 | B2 * | 4/2012 | Song et al. | 717/140 |
| 8,230,397 | B2 * | 7/2012 | Farrell et al. | 717/124 |
| 2003/0145310 | A1 * | 7/2003 | Thames et al. | 717/123 |
| 2005/0050520 | A1 * | 3/2005 | Motoyama et al. | 717/123 |
| 2005/0278318 | A1 * | 12/2005 | Vasilik et al. | 707/3 |
| 2005/0278700 | A1 * | 12/2005 | Buskens et al. | 717/120 |
| 2009/0183141 | A1 * | 7/2009 | Tai et al. | 717/124 |
| 2009/0235239 | A1 * | 9/2009 | Lee et al. | 717/140 |
| 2010/0023926 | A1 * | 1/2010 | Sugawara et al. | 717/120 |
| 2010/0037209 | A1 * | 2/2010 | Sasaki | 717/123 |
| 2010/0042974 | A1 * | 2/2010 | Gutz et al. | 717/121 |
| 2010/0050156 | A1 * | 2/2010 | Bonanno et al. | 717/122 |

OTHER PUBLICATIONS

Carl A. Gunter, Abstracting Dependencies between Software Configuration Items, 2000, pp. 96-106.*
Cleidson Ronal Botelho de Souza, on the Relationship between Software Dependencies and Coordination Field Studies and Tool Support, 2005, pp. 21-36.*
Wenfei Fan, Dependencies Revised for Improving Data Quality, 2008, pp. 159-166.*

* cited by examiner

*Primary Examiner* — Thuy Dao
*Assistant Examiner* — Mongbao Nguyen
(74) *Attorney, Agent, or Firm* — Fliesler Meyer LLP

(57) ABSTRACT

A fully declarative build system is described for software build optimization. The build system supports complete control over build and test inputs and build and test operations. The build system takes inputs from a source control system. The inputs can include source code files, test files and various site files used to generate human-oriented materials for the modules. A dependencies file specifies a set of dependencies among the modules of the system. When invoked, the build system determines that changes have been made to the inputs. The system then parses the dependencies file, and based on it, determines exactly which inputs will be affected by the changes. The build system can then rebuild only those modules that will be affected by the changes, as determined from the dependencies file. Alternatively, the system may only perform testing or document generating for files which are dependent on the modified file.

12 Claims, 4 Drawing Sheets

US 8,627,286 B2

FULLY DECLARATIVE BUILD SYSTEM FOR BUILD OPTIMIZATION

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally software development and more particularly to build and compile systems for software products.

BACKGROUND

A computer program is typically made up of multiple modules. A module can be thought of as any part of the system that is built as a separate unit. Alternatively, the term module can apply to parts of the system that are shipped as a separate unit. As such, the term module can encompass both build time modules and run time modules.

When building a computer program, the various modules of the program may often be dependent on one another. As such, when one module changes, other modules may or may not change accordingly. As a result of this, all or most of the modules typically need to be rebuilt in order to ensure that the program is structurally sound and was not broken by the changes.

During the process of software development, a computer program is usually compiled and built multiple times over. Especially when producing large systems, building and testing the system can be quite time consuming. For example, each build of a large system may take several hours to re-compile and rebuild the system. As a result of this, many large enterprises now perform continuous builds, which continuously re-build the product or system while the developers are simultaneously working on modifying their source code. The goal of a continuous build is to detect errors. If a continuous build system is slow, then the feedback about these errors is slow and leaves the system in a broken state for longer periods of time. In this context, a developer may make a mistake that affects the work of other developers and may not know that this has happened for a significant period of time.

Various attempts have been made to optimize the build process, however, most of these attempts have tried to optimize only at the microcosmic level and on an informal basis. For example, developers may create some type of reference systems so that they know which modules will be affected by changes in a particular source code file. However, this requires some sort of coordination among people and usually does not reduce the time-consumption of entire re-builds of the system.

In light of this, what is needed is a system for more rapid development of software products, that promotes faster production of code while simultaneously ensuring the integrity and consistency of the system. In addition, a system is desirable that can predict with certainty the effects of various changes in source code files and other inputs to the build system. The applicant-inventor has identified these shortcomings as well as other needs in the art and conceived the subject matter described in this disclosure.

SUMMARY OF INVENTION

In this specification, a fully declarative build system is described for software build optimization. The build system supports complete control over build and test inputs and build and test operations. The build system takes inputs from a source control system. These inputs can include source code files, test files and various site files used to generate human oriented materials for the modules. Furthermore, a dependencies file is maintained, which specifies a set of dependencies among the modules of the system. For example, the dependencies file can specify that a particular module depends on several other modules and/or test files, such that if any of these dependent-upon modules are changed, the particular module will be known to be affected by these changes and will have to be rebuilt.

In various embodiments, when invoked, the build system determines that one or more modifications have been made to at least one of the inputs (e.g. source code file, test file, etc.). The system then reads and parses the dependencies file, and based on that, determines exactly which inputs will be affected by the one or more modifications. The build system can then rebuild only those modules that will be affected by the one or more modifications as determined from the dependencies file. In alternative embodiments, the build system may only perform the testing or generating of documentation for the files which are dependent on the modified file.

DETAILED DESCRIPTION

Figure 1:
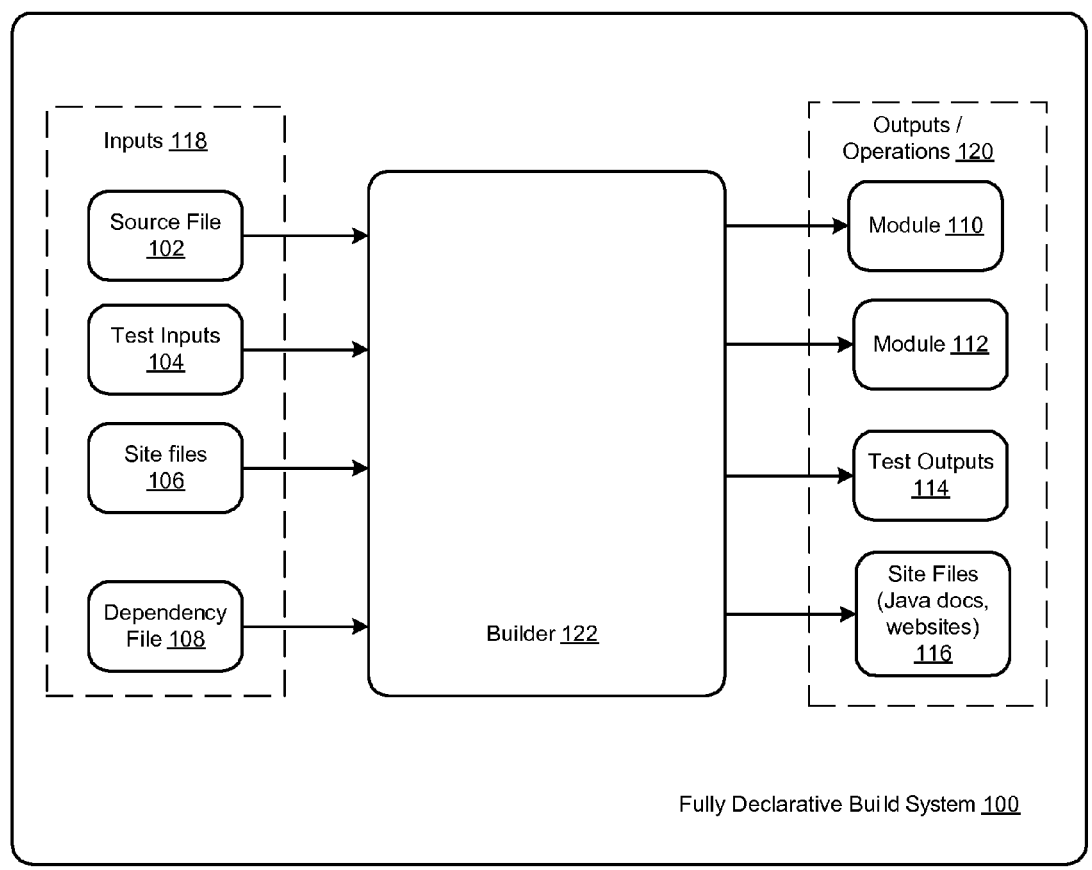
FIG. 1 is an illustration of the fully declarative build system, in accordance with various embodiments of the invention.

In the following description, the invention will be illustrated by way of example and not by way of limitation in the figures of the accompanying drawings. References to various embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

Furthermore, in certain instances, numerous specific details will be set forth to provide a thorough description of the invention. However, it will be apparent to those skilled in the art that the invention may be practiced without these specific details. In other instances, well-known features have not been described in as much detail so as not to obscure the invention.

The embodiments of the present invention encompass a fully declarative build system that optimizes the build process of software systems. The build system supports complete control over build and test inputs, and build and test operations. The build system takes inputs from a source control system. These inputs can include source code files, test files and various site files used to generate human oriented materials for the modules. A dependencies file is maintained under the source control, which specifies a set of dependencies among the modules of the system. For example, the dependencies file can specify that a particular module depends on several other modules and/or test files, such that if any of these dependent-upon modules is changed, the particular module will be affected as well.

In various embodiments, when invoked, the build system determines that one or more modifications have been made to at least one of the inputs (e.g. source code file, test file, etc.). The system then reads and parses the dependencies file, and based on that, determines exactly which inputs will be affected by the one or more modifications. The build system can then rebuild only those modules that will be affected by the one or more modifications as determined from the dependencies file.

As mentioned above, the build system supports complete control over various inputs and operations. By controlling the inputs, the operations can be optimized such that when inputs are changed only the necessary operations are performed. In various embodiments, the inputs to the build system can be source code files, test files, site files used to generate human-oriented materials, or any other files in the source control system. The outputs can be the executable binaries, tests, javadocs, websites and other products of the build.

By controlling the operations, it can be made certain that there are no extraneous inputs or outputs that are unaccounted for and may lead to different results when different operations are skipped. For example, in one embodiment, the modules should not reference any remote functionality (e.g. external website) which is unaccounted for.

In general, build systems vary in the amount of declarative vs. procedural code. Most build system like "make" or "ant" are mostly procedural in that the tool does not really understand the operations it is performing. Other tools, like "maven", are mostly declarative, but still do not really fully control inputs and certainly not operations (outputs are controlled). By requiring ownership of both inputs and operations, the build system described throughout this disclosure is somewhat less flexible but affords benefits in terms of optimization. For example, because the system needs to be fully declarative and requires ownership of all inputs and outputs, the modules should not easily reference external functionality which is unaccounted for. Because of this, however, the system can be optimized so that the effect of any module change will be known with certainty. By building and testing only the modules that would possibly be affected by the changes, the system is able to be build and test changes in significantly less time than would otherwise be required.

In various embodiments, there can be three major goals of the build system: to build the executable binaries for the modules from the source code files, to test and verify the modules and to generate the documentation, and other human readable materials for those modules. The fully declarative build system can perform each of these functions in an optimized fashion by using one or more dependency files. The dependency file can be implemented as a text file or as an extensible markup language (XML) file.

In one embodiment, the optimization rules are as follows:
a. If all files are site files (Java documents, website, and other human-oriented materials), or if the only files that are changed are site files, then only the site phase of the build is performed and only for those modules with changed files.
b. If all files are test files, or if the only files that are changed are test files, then only the test phase of the build is performed and only for those modules with changed files.
c. Otherwise, the build, test and site phases are performed for each module with changes, as well as any module which depends directly or indirectly on a changed module.

In alternative embodiments, this optimization process can be further modified to account for cases where the only changes are made to both the site and test files. In those cases, both the site and test phases of the build would be performed only for those modules with changed files.

FIG. 1 is an illustration of the fully declarative build system, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the fully declarative build system 100 can require ownership and control of all inputs 118 and outputs/operations 120. The inputs to the builder 122 can be various source code files 102, site files 104 and test files 106. In addition, the build system parses a dependencies file 108 (e.g. dependencies.txt) which specifies the dependencies among the various modules in the system.

The inputs are used by the build system to generate the executable binaries for the modules 110, 112, the test outputs 114 and the website, Java documents and other user/developer documentation 116. In one embodiment, the builder 122 parses the dependencies file 108 and determines which modules would be affected by any changes that were made to the inputs. For example, if module A depends on module B and if module B was modified by the developer, the build system can know with certainty that module A will also need to be rebuilt at build time. On the other hand, if only a test file was changed in the inputs, the build system knows that it would only need to perform the testing portion of the build. In this manner, the fully declarative build system can fully optimize the build process in order to assure that the effects of all changes would be known with certainty.

Figure 2:
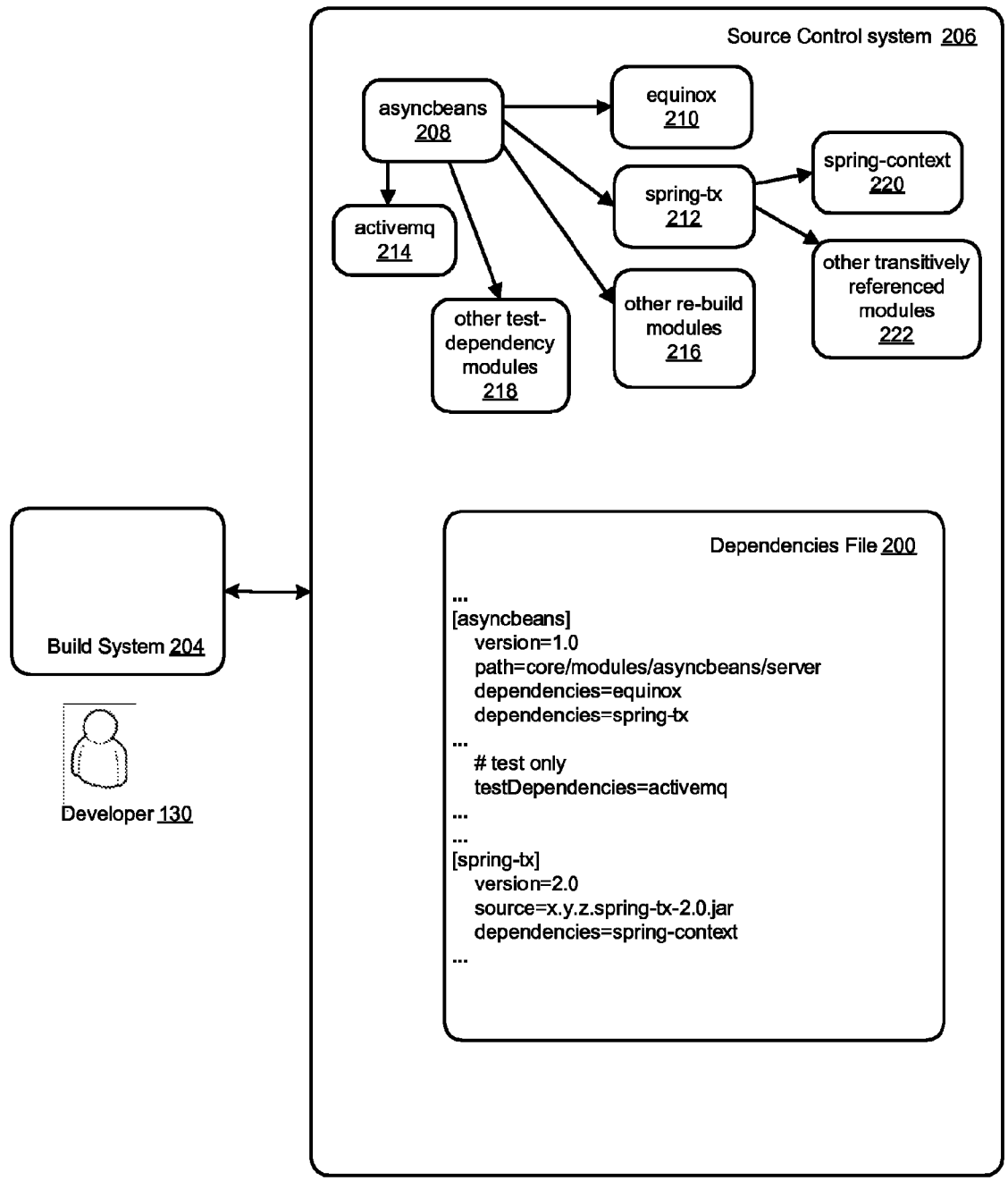
FIG. 2 is an illustration of the fully declarative build system implementing the dependencies file, in accordance with various embodiments of the invention.

FIG. 2 is an illustration of the fully declarative build system implementing the dependencies file, in accordance with various embodiments of the invention. Although this diagram depicts components as logically separate, such depiction is merely for illustrative purposes. It will be apparent to those skilled in the art that the components portrayed in this figure can be combined or divided into separate software, firmware and/or hardware. Furthermore, it will also be apparent to those skilled in the art that such components, regardless of how they are combined or divided, can execute on the same computing device or can be distributed among different computing devices connected by one or more networks or other suitable communication means.

As illustrated, the dependencies file 200 can specify the dependencies among the files in the source control system 206. The dependencies file can be maintained by the developer 202 of each module and this file would be parsed by the build system 204 at build time. For example, as shown in the illustration, the dependencies file specifies that the module "asyncbeans" 208 depends on the module "equinox" 210 (e.g. "dependencies=equinox"). Similarly, module "asyncbeans" also depends on module "spring-tx" 212, as well as other modules 216. This signifies that if the source code file for any of these modules were to be modified by the developer, the builder would know to rebuild and re-test the module "asyncbeans" as well.

In one embodiment, the dependencies files are also under source control and changes to the files are analyzed appropriately. For example, if a section of the dependencies file 200 corresponding to "asyncbeans" is modified, then it is perceived that the source of the "asyncbeans" applies as if a source file in the module is modified. Further, if the modified values for "asyncbeans" only apply to testing, then only the test phase is affected.

As further illustrated in this figure, the dependencies can be transitive. For example, as specified in this particular dependencies file, the module "spring-tx" 212 in turn depends on module "spring-context" 220 and other modules 222. In other words, module "asyncbeans" 208 depends on module "spring-tx" 212 and module "spring-tx" 212 in turn depends on module "spring-context" 220. As a result of this transitive dependency, the module "asyncbeans" 208 also depends on "spring-context" 220 and if "spring-context" 220 were to be modified, the module "asyncbeans" 208 would need to be rebuilt and re-tested by the build system.

In addition, the dependencies file 200 can specify test dependencies. Test dependencies specify that if a module referenced by the test dependency were to be modified, then the build system would only need to re-test, rather than having to perform the full build cycle. For example, the test dependencies of module "asyncbeans" 208 are "activemq," 214 and any other test dependencies (218). This means that if the "activemq" 214 module were to be changed, then the build system would only need to re-test the module "asyncbeans" 208 and would not need to re-build it fully. In one embodiment, the reason the system knows with certainty that it will only need to re-test is because nothing else will be used as inputs to the build, except for the files listed as dependencies. Thus, in this embodiment, the "asyncbeans" module cannot depend on any other module because it will not try to use any other module.

In various embodiments, the developer 202 can be provided with an automated tool that automatically generates some or all of the dependency lines in the dependencies file. The automated tool can be an application or module that parses the input files in the source control system and determines which module will invoke or reference other modules and, based on this information, creates the dependency lines for the dependency file.

It should be noted that the format of the dependencies file is shown in this figure purely for purposes of illustration and is not intended to limit the invention disclosed herein. Various alternative formats, descriptions and content can be used to express the dependencies and relationships within the dependencies file(s).

Figure 3:
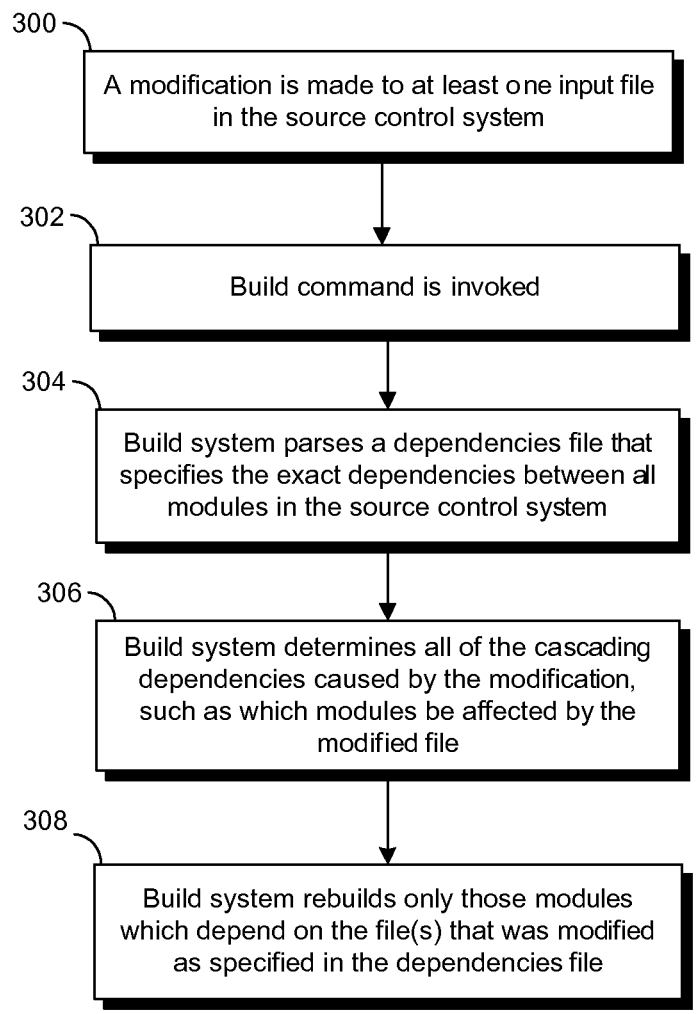
FIG. 3 is a flow chart diagram of the process for providing a fully declarative build system, in accordance with various embodiments of the invention.

FIG. 3 is a flow chart diagram of the process for providing a fully declarative build system, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As shown in step 300, as the developer is working on coding a particular module, he/she may make changes to an input file in the source control system. When the build command is invoked (step 302), the build system parses a dependencies file that specifies the exact dependencies between all modules in the source control system, as shown in step 304. Based on the information parsed from this file, the system can determine all of the cascading dependencies caused by the modifications, such as which modules be affected by the modified file, as shown in step 306. As a result of this, the build system needs to rebuild or re-test only those modules which depend on the file(s) that were modified, as specified in the dependencies file (step 308).

Figure 4:
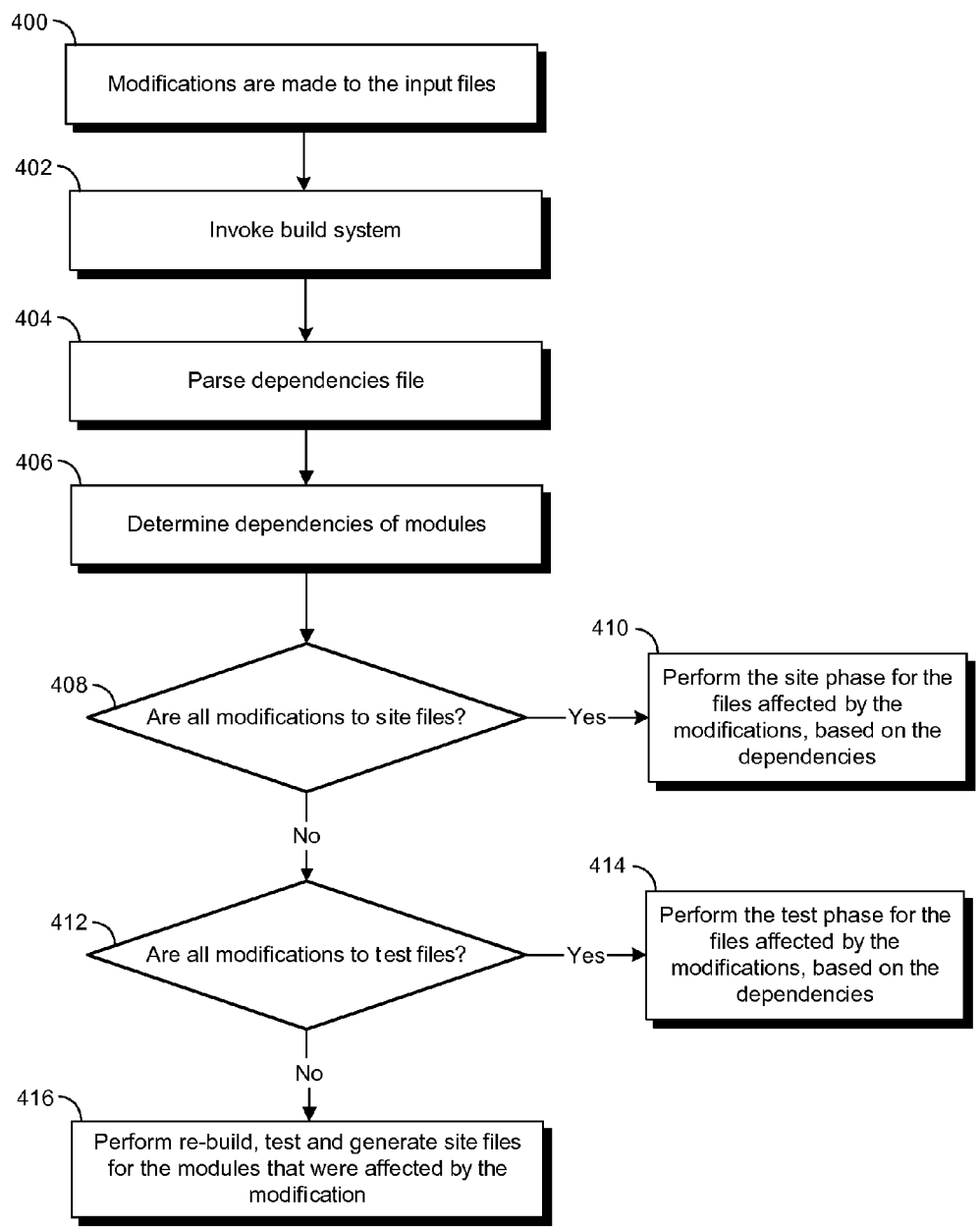
FIG. 4 is a flow chart diagram of the process for optimizing the build, in accordance with various embodiments of the invention.

FIG. 4 is a flow chart diagram of the process for optimizing the build, in accordance with various embodiments of the invention. Although this figure depicts functional steps in a particular sequence for purposes of illustration, the process is not necessarily limited to this particular order or steps. One skilled in the art will appreciate that the various steps portrayed in this figure can be changed, rearranged, performed in parallel or adapted in various ways. Furthermore, it is to be understood that certain steps or sequences of steps can be added to or omitted from this process, without departing from the spirit and scope of the invention.

As illustrated in step 400, modifications are made to the various input files (source code files, test files, site files, etc.). In step 402, the build system is invoked and, in step 404, it reads and parses the dependencies file, as previously described. Based on this file, the system determines the dependencies between the various modules of the system, as shown in step 406.

In step 408, the system determines whether all files which were modified are site files (Java documents, website, and other human-oriented materials). If they are, then only the site phase of the build is performed and only for those modules with changed files, as shown in step 410. If they are not, the process continues to step 412.

In step 412, the system determines whether all of the modified files are test files. If this is true, then only the test phase of the build is performed and only for those modules with changed files, as shown in step 414.

Otherwise, the build, test and site phases are performed for each module with changes, as well as any module which depends directly or indirectly on a changed module, as illustrated in step 416.

Throughout the various contexts described in this disclosure, the embodiments of the invention further encompass computer apparatus, computing systems and machine-readable media configured to carry out the foregoing systems and methods. In addition to an embodiment consisting of specifically designed integrated circuits or other electronics, the present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. The computer program product can be transmitted in whole or in parts and over one or more public and/or private networks wherein the transmission includes instructions which can be used by one or more processors to perform any of the features presented herein. In various embodiments, the transmission may include a plurality of separate transmissions.

The foregoing description of the preferred embodiments of the present invention has been provided for purposes of illustration and description. It is not intended to be exhaustive or to limit the invention to the precise forms disclosed. Many modifications and variations can be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A microprocessor-implemented method of fully declarative building of software components for build optimization, said method comprising:
   controlling a set of input files used to build a plurality of executable modules of a software program, said input files including a plurality of source code files for building said plurality of executable modules; a plurality of test files for testing said plurality of executable modules, and a plurality of site files for generating documentation for said plurality of executable modules;
   determining that one or more modifications have been made to at least one of the set of input files;
   reading a dependencies file that specifies a set of dependencies among each of the inputs and analyzing all cascading dependencies;
   selecting, based on the dependencies file, a subset of the inputs that are associated with said one or more modifications;
   processing only the selected subset of inputs,
      wherein if the selected subset of inputs includes only one or more of said plurality of site files, said processing consists essentially of performing only a site phase of the build for generating documentation,
      wherein if the selected subset of inputs includes a source code file, performing build, test and site phases for each input with the modifications, and for any input which depends directly or indirectly on an input containing the modifications, as determined by parsing the dependencies file, and
      wherein if the selected subset of inputs includes only one or more of said plurality of test files, said processing consists essentially of testing said one or more of said plurality of executable modules using only said test files to which said one or more modifications have been made, without rebuilding any of said plurality of executable modules.

2. The method of claim 1, further comprising imposing a constraint which requires ownership of all inputs and outputs.

3. The method of claim 1, wherein the dependencies file further specifies one or more test dependencies, such that if the modifications are made to input files referenced as the test dependencies for an executable module, the executable module is only re-tested, without re-building said executable module.

4. The method of claim 1, wherein the dependencies are transitive, such that if a first input depends on a second input, and a second input depends on a third input, then said first input depends on said third input.

5. The method of claim 1, wherein the dependencies file references each input of the system and for each input of the system, specifies a set of inputs which said each input depends on.

6. The method of claim 1, wherein the dependencies file is generated by an automated tool that examines each input file in the source control system and determines which other inputs, said each input file employs.

7. A fully declarative build system including one or more microprocessors for software build optimization, said system comprising:
   a source control system that controls a set of inputs, said inputs including a plurality of source code files, a plurality of test files, and a plurality of site files;
   a dependencies file that specifies a set of dependencies among each of the inputs, said dependencies file being part of the source control system;
   a builder operating on said one or more microprocessors, wherein the builder is adapted to
      build a plurality of executable software modules from said plurality of source code files,
      test said plurality of executable software modules using said plurality of test files, and
      generate documentation for the said plurality of executable software modules based on said plurality of site files;
   wherein when the builder determines that one or more modifications has been made to at least one of said inputs, the builder reads the dependencies file, and determines exactly which of said inputs will be affected by the one or more modifications based on said set of dependencies specified in the dependencies file;
   wherein, if the builder determines that all of the modifications have been made solely to one or more of said plurality of site files, the builder performs only the document generation and only for said one or more of said plurality of site files in which a modification has been made;
   wherein, if the builder determines that one or more of said plurality of source code files was modified by said one or more modification, the builder performs the build, test and document generation for each of said inputs which is affected by said one or more modification, as determined from the dependencies file; and
   wherein, if the builder determines that all of the one or more modifications have been made solely to one or more of said plurality of test files, the builder tests said plurality of executable software modules using only said one or more of said plurality of test files to which said one or more modifications have been made, without rebuilding any of said plurality of executable software modules.

8. The system of claim 7, wherein, the system requires ownership of all inputs and outputs.

9. The system of claim 7, wherein the dependencies file further specifies one or more test dependencies for an executable software module, such that if the modifications are made to the input referenced as the test dependencies for said executable software module, the builder only re-tests said executable software module, without re-building said executable software module.

10. The system of claim 7, wherein the dependencies are transitive, such that if a first input depends on a second input, and a second input depends on a third input, then said first input depends on said third input.

11. The system of claim 7, wherein the dependencies file is generated by an automated tool that examines each of said set of inputs in the source control system and determines which other of said set of inputs said input employs.

12. A non-transitory computer-readable storage medium carrying one or more sequences of instructions for fully declarative building of software components for build optimization, which instructions, when executed by one or more microprocessors, cause the one or more microprocessors to carry out steps comprising:

controlling a set of input files used to build a plurality of executable modules of a software program, said input files including a plurality of source code files for building said plurality of executable modules; a plurality of test files for testing said plurality of executable modules, and a plurality of site files for generating documentation for said plurality of executable modules;

determining that one or more modifications have been made to at least one of said set of input files;

reading a dependencies file that specifies a set of dependencies among each of said one or more input files and analyzing all cascading dependencies; and selecting, based on the dependencies file, a subset of said input files that are associated with said one or more modifications;

processing only the selected subset of input files,
  wherein if the selected subset of input files includes only one or more of said plurality of test files, said processing consists essentially of testing said one or more of said plurality of executable modules using only said test files to which said one or more modifications have been made, without rebuilding any of said plurality of executable modules,
  wherein if the selected subset of inputs includes only one or more of said plurality of site files, said processing consists essentially of performing only a site phase of the build for generating documentation, and
  wherein if the selected subset of inputs includes a source code file, performing build, test and site phases for each input with the modifications, and for any input which depends directly or indirectly on an input containing the modifications, as determined by parsing the dependencies file.

* * * * *